United States Patent
Shigeno et al.

(10) Patent No.: US 9,759,914 B2
(45) Date of Patent: Sep. 12, 2017

(54) HEADUP DISPLAY APPARATUS

(71) Applicant: NIPPON SEIKI CO., LTD., Niigata (JP)

(72) Inventors: Takanori Shigeno, Niigata (JP); Kazuya Matsuura, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/914,482

(22) PCT Filed: Aug. 7, 2014

(86) PCT No.: PCT/JP2014/070862
§ 371 (c)(1),
(2) Date: Feb. 25, 2016

(87) PCT Pub. No.: WO2015/029738
PCT Pub. Date: Mar. 5, 2015

(65) Prior Publication Data
US 2016/0209649 A1  Jul. 21, 2016

(30) Foreign Application Priority Data

Aug. 28, 2013 (JP) ................................ 2013-176777

(51) Int. Cl.
*G02F 1/1335* (2006.01)
*G02B 27/01* (2006.01)
(Continued)

(52) U.S. Cl.
CPC ... *G02B 27/0101* (2013.01); *G02F 1/133605* (2013.01); *G03B 21/006* (2013.01);
(Continued)

(58) Field of Classification Search
CPC .......... G02B 27/0101; G02F 1/133605; G03B 21/006
(Continued)

(56) References Cited

U.S. PATENT DOCUMENTS

2013/0279013 A1* 10/2013 Edwards ............ G02B 27/0189
359/630
2014/0022645 A1  1/2014 Matsuura et al.

FOREIGN PATENT DOCUMENTS

JP   09-159986 A   6/1997
JP   2007-086387 A   4/2007
(Continued)

OTHER PUBLICATIONS

International Search Report PCT/JP2014/070862 dated Sep. 16, 2014 with English translation.

*Primary Examiner* — Lucy Chien
(74) *Attorney, Agent, or Firm* — McDermott Will & Emery LLP

(57) ABSTRACT

Provided are: a backlight unit that is capable of increasing the degree of freedom in design of a device on which the backlight unit is mounted; and a display device which is provided with this backlight unit. This backlight unit is provided with: a light source which emits light that illuminates a liquid crystal display element; a light collection means for focusing the light emitted from the light source on a display region (A) of the liquid crystal display element; and a reflective part which has a reflective surface that reflects the light emitted from the light source toward the liquid crystal display element. This backlight unit is configured such that the optical path for the light from the light source to the liquid crystal display element is replicated at the reflective part by having the reflective surface inclined to the optical axis (AX) of the light source.

3 Claims, 5 Drawing Sheets

(51) Int. Cl.
*G03B 21/00* (2006.01)
*G03B 21/20* (2006.01)

(52) U.S. Cl.
CPC .... *G03B 21/2066* (2013.01); *G02B 2027/015* (2013.01); *G02F 2001/133607* (2013.01)

(58) Field of Classification Search
USPC .......................................................... 349/11
See application file for complete search history.

(56) References Cited

FOREIGN PATENT DOCUMENTS

| | | | | |
|---|---|---|---|---|
| JP | 2007-219222 A | 8/2007 | | |
| JP | 2008-257021 A | 10/2008 | | |
| JP | 2009-168882 A | 7/2009 | | |
| JP | 2012-203176 A | 10/2012 | | |
| KR | 2001054283 A | * | 7/2001 | ............... H04N 5/74 |

* cited by examiner

HEADUP DISPLAY APPARATUS

CROSS-REFERENCE TO RELATED APPLICATIONS

This Application is the U.S. National Phase of PCT/JP2014/070862 filed Aug. 7, 2014, which claims priority to Japanese Patent Application No. 2013-176777 filed Aug. 28, 2013. The subject matter of each is incorporated herein by reference in entirety.

TECHNICAL FIELD

The present invention relates to a backlight unit and a display device provided with the same.

BACKGROUND ART

As a display device for displaying a predetermined image, there is a known device that is configured to illuminate a liquid crystal display element by backlighting. Patent Literature 1 discloses a display device called a headup display (HUD) apparatus that is provided with a display device having such a configuration. A HUD apparatus allows a user (mainly a driver) to recognize a predetermined image as a virtual image by projecting display light from a display device to a windshield of a vehicle.

In the display device according to the Patent Literature 1, an optical path from a light source for backlighting to a liquid crystal display element is aligned, a light control member and a diffusion plate are arranged to be layered on the optical path, and a backlight unit is thereby configured behind the liquid crystal display element.

CITATION LIST

Patent Literature

Patent Literature 1: Japanese Unexamined Patent Application Publication No. 2007-86387

SUMMARY OF THE INVENTION

Problems to be Solved by the Invention

In the configuration that the optical path from the light source for backlighting to the liquid crystal display element is aligned as disclosed in the Patent Literature 1, when an optical element such as a lens is disposed between the light source and the liquid crystal display element, the shape of the backlight unit extends rearward the liquid crystal display element. Thus, the degree of freedom in designing a device to mount the backlight unit might be decreased.

The present invention has been made in view of the above circumstances. Accordingly, it is an object of the present invention to provide a backlight unit capable of increasing the degree of freedom in designing a mounting device, and a display device provided with the same.

Solution to Problem

In order to achieve the above object, a backlight unit according to a first aspect of the present invention comprises:
a light source for emitting light to illuminate a liquid crystal display element;
a condensing means for condensing the light emitted from the light source to correspond to a display area of the liquid crystal display element; and
a reflective part having a reflective surface for reflecting the light emitted from the light source to the liquid crystal display element,
wherein the reflective surface is inclined to an optical axis of the light source, and an optical path of the light from the light source to the liquid crystal display element is replicated at the reflective part.

In order to achieve the above object, a display device according to a second aspect of the present invention is characterized by comprising the backlight unit and the liquid crystal display element, emitting display light to the outside of a device, the display light generated by that the liquid crystal display element is illuminated by the light from the light source, and allowing to recognize an image represented by the display light at a predetermined position outside the device.

Effect of the Invention

According to the present invention, it is possible to provide a backlight unit capable of increasing the degree of freedom in designing a mounting device, and a display device provided with the same.

MODE FOR CARRYING OUT THE INVENTION

Hereinafter, a backlight unit according to an embodiment of the present invention will be described with reference to the drawings.

Figure 1:
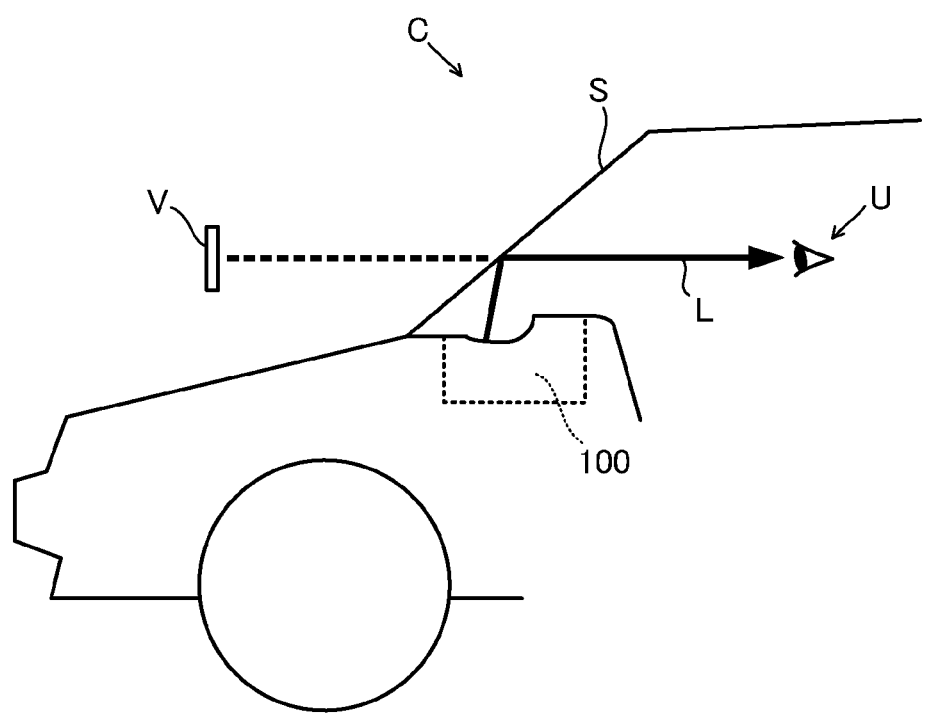
FIG. 1 is a schematic diagram for explaining a mounted state of a HUD apparatus according to an embodiment of the present invention.

The backlight unit according to this embodiment is mounted in a headup display (HUD) apparatus 100 shown in FIG. 1.

Figure 2:
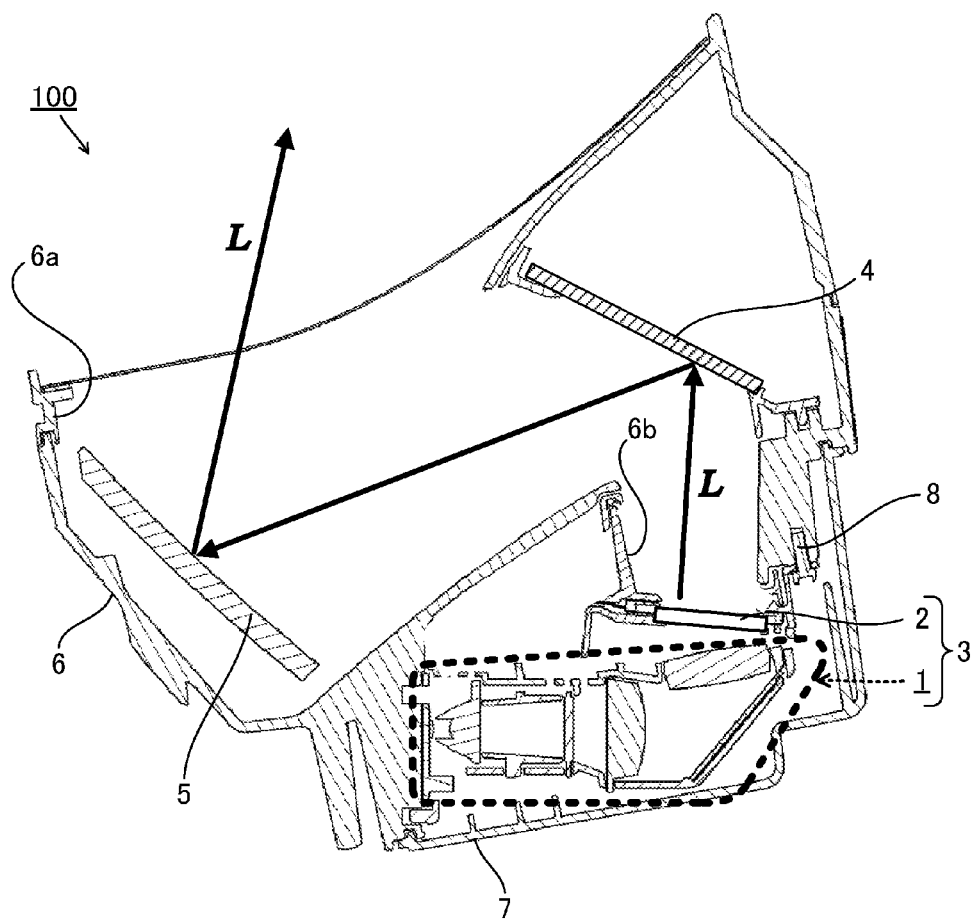
FIG. 2 is a schematic sectional view of a HUD apparatus according to an embodiment of the present invention.

The HUD apparatus 100 is provided to be embedded in a dashboard of a vehicle C, and as shown in FIG. 2, provided with a display device 3 comprising a backlight unit 1 and a liquid crystal display element 2, a plane mirror 4, a concave mirror 5, a housing 6, and a protection member 7.

The HUD apparatus 100 projects display light L emitted from the display device 3 to a windshield S (front glass) of the vehicle C, and allows a user U (mainly a driver) to recognize an image represented by the display light L as a virtual image V. The display light L exiting from the display device 3 is obtained by that the liquid crystal display element 2 is passed through and illuminated by the light from the backlight unit 1. As a result, the display light L represents a predetermined image.

Figure 3:
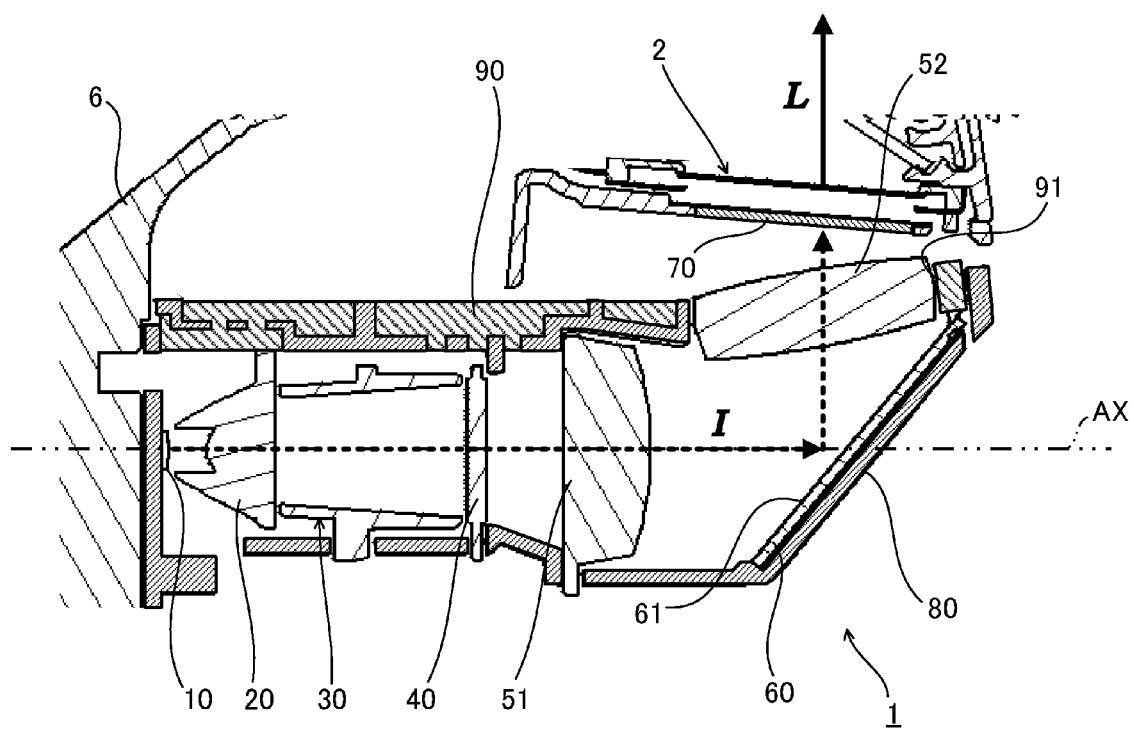
FIG. 3 is an enlarged view of the vicinity of a display device of the HUD apparatus shown in FIG. 2.

The backlight unit 1, as shown in FIG. 3, comprises a light source 10, a parallel light generation means 20, an illuminance uniforming means 30, a lens array 40, a first focus lens 51, a second focus lens 52, a reflective part 60, a diffusion plate 70, a case body 80, and a cover member 90.

The parallel light generation means 20, the illuminance uniforming means 30, the lens array 40, the first focus lens 51, the second focus lens 52, the reflective part 60, and the diffusion plate are arranged on an optical path of the light emitted from the light source 10. They are arranged from the light source 10 to the liquid crystal display element 2 in the order of the parallel light generation means 20, the illuminance uniforming means 30, the lens array 40, the first focus lens 51, the reflective part 60, the second focus lens 52, and the diffusion plate 70.

The light source 10 emits light that passes through and illuminates the liquid crystal display element 2 (hereinafter, called illumination light I). The light source 10 comprises two LEDs (Light Emitting Diode), for example. The light source 10 may comprise one or more than three LEDs. The light source 10 is mounted on a circuit board 11 (see FIG. 4) fixed to the case body 80. The circuit board 11 is provided with a circuit pattern that is formed on a base material made of aluminum, resin or the like, and is conductively connected to a control unit described later (not shown) by a known method.

The parallel light generation means 20 receives the illumination light I from the light source 10, and emits it as parallel light. The parallel light mentioned here is light that advances substantially (just) parallel to an optical axis AX of the light source 10 (see FIG. 3). The parallel light generation means 20 comprises a condenser lens, for example. The parallel light generation means 20 may comprise other known optical element such as a collimator lens.

The illuminance uniforming means 30 receives the illumination light I collimated by the parallel light generation means 20, and uniforms the illuminance distribution of the light on the exit side. The illuminance uniforming means 30 comprises a light box, for example. The light box is a square tube-shaped member surrounding the optical axis AX, and has a mirror surface inside (side close to the optical axis AX). The illuminance uniforming means 30 may be other known light box or the like provided with a light diffusion plate, a light reflection plate and the like.

The lens array 40 is a lens body formed by arranging a plurality of single lens vertically and horizontally, and is a so-called fly-eye lens. The lens array 40 is, for example, a so-called double-convex lens that both sides close to the light source 10 and the liquid crystal display element 2 are convex.

The lens array 40 receives the illumination light I with the illuminance substantially uniformed by the illuminance uniforming means 30. The lens array 40 generates multiple images of the number of the lenses constituting itself, and an image of one light source 10 is formed into multiple images of the number of the lenses of the lens array 40. Thus, even a less number of light source 10 can illuminate the liquid crystal display element 2 in uniform distribution of light intensity.

Figure 5:
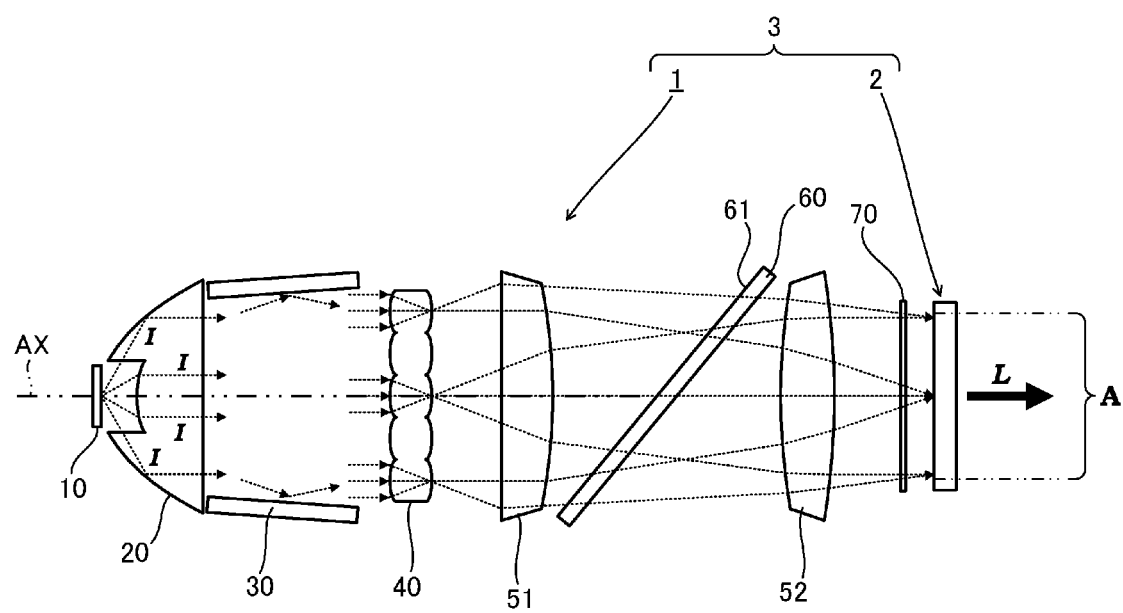
FIG. 5 is a schematic diagram for explaining a function of a backlight unit according to an embodiment of the present invention.

The first focus lens 51 and the second focus lens 52 function as a condensing means that condenses light to correspond to a display area A of the liquid crystal display element 2 (see FIG. 5). In particular, the first focus lens 51 and the second focus lens 52 cooperate to irradiate the illumination light I from the lens array 40 over the entire surface of the rear side corresponding to a displayable area (display area A) of an image displayed on the front surface of the liquid crystal display element 2 (the surface facing upward in FIGS. 2 and 3). Thus, it is possible to efficiently irradiate the illumination light I representing the multiple images generated by the lens array 40 to a necessary range on the rear side of the liquid crystal display element 2.

The first focus lens 51 and second focus lens 52 comprise an acrylic lens, for example. At least one of them is configured as a toroidal lens. In other words, at least one of both sides, four sides, of the first focus lens 51 and second focus lens 52 is configured as a toroidal lens. Thus, the illumination light I passing through the first focus lens 51 and the second focus lens 52 is distributed in a rectangular shape, and is efficiently irradiated to the liquid crystal display element 2 according to the shape of the display area A of the liquid crystal display element 2 that is mostly formed in a rectangular shape.

The reflective part 60 is arranged between the first focus lens 51 and the second focus lens 52. The reflective part 60 is, for example, composed of a plane mirror with the reflective surface 61 formed by depositing a metal such as aluminum on a base material made of resin, glass or the like. The reflective part 60 is arranged with the reflective surface 61 inclined to the optical axis AX of the light source 10. The illumination light I from the first focus lens 51 reflects on the reflective surface 61, and enters into the second focus lens 52.

In this embodiment, as shown in FIG. 3, the reflective part 60 is arranged such that the optical path of the illumination light I from the reflective part 60 to the liquid crystal display element 2 is substantially perpendicular to the optical axis AX of the light source 10. In this configuration, the reflective part 60 changes the optical path of the illumination light I.

The diffusion plate 70 is, for example, made of synthetic resin material unevenly processed in at least one of the surfaces, and is transmissive. The illumination light I from the second focus lens 52 is diffused by passing through the diffusion plate 70, and reaches the rear side of the liquid crystal display element 2. Since the diffusion plate 70 is provided as above, uneven illumination of the liquid crystal display element 2 is minimized.

Figure 4:
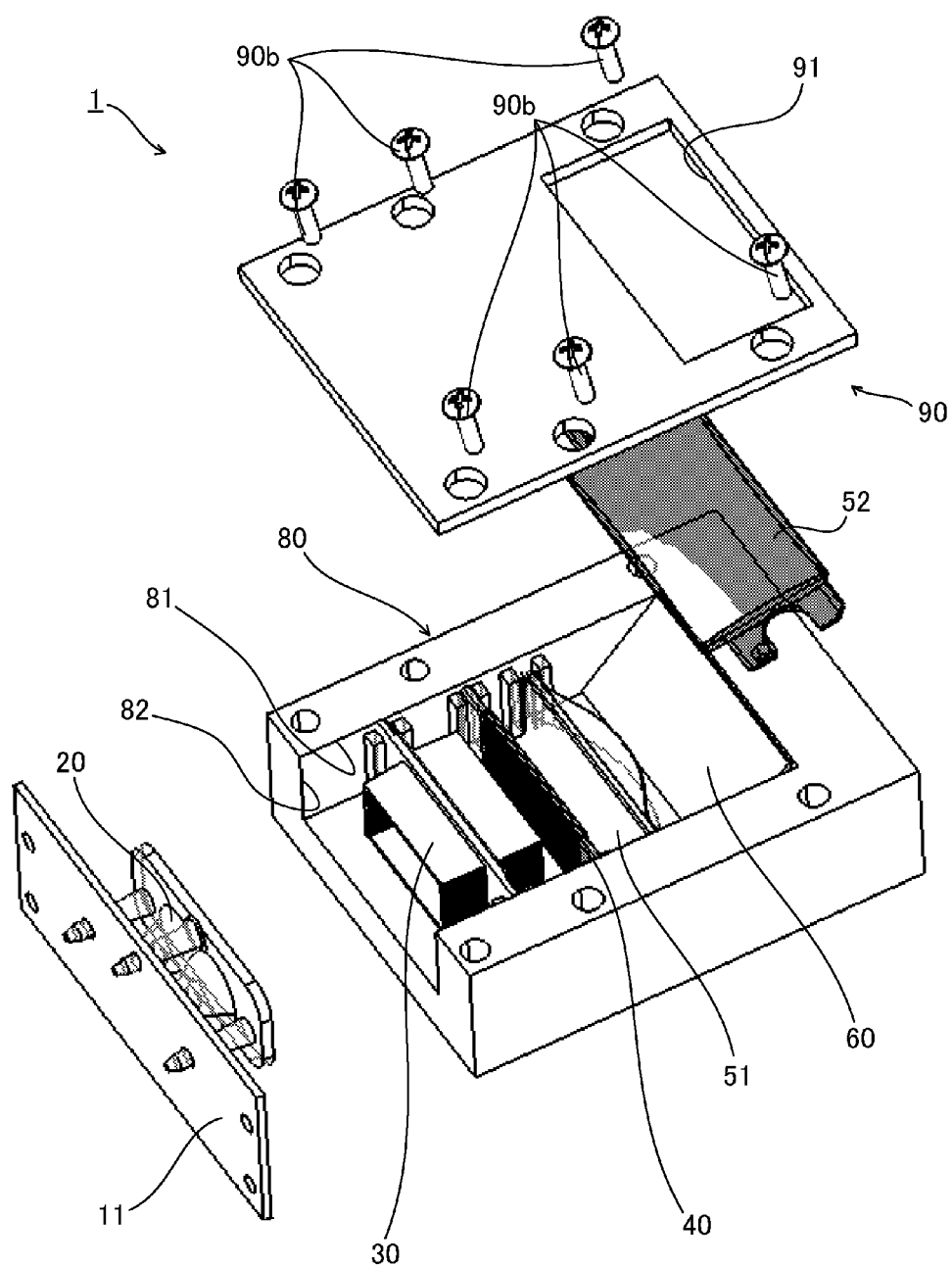
FIG. 4 is a schematic exploded perspective view of a backlight unit according to an embodiment of the present invention.

The case body 80 is formed in a box shape from resin or the like. The case body 80 contains the light source 10, the parallel light generation means 20, the illuminance uniforming means 30, the lens array 40, the first focus lens 51, and the reflective part 60. The case body 80 has, as shown in FIG. 4, an upper opening 81 and a side opening 82. The upper opening 81 opens toward the liquid crystal display element 2. The side opening 82 opens toward the light source 10. The upper opening 81 and the side opening 82 are communicated. The circuit board 11 is provided to close the side opening 82. The circuit board 11 is fixed to the case body 80 by a fixing means such as a screw (not shown). Thus, the light source 10 is arranged to emit light to the inside of the case body 80. The second focus lens 52 is provided to cover the end portion of the upper opening 81 opposite to the light source 10. The cover member 90 is provided to close the upper opening 81.

The cover member 90 is formed in a plate-shape from resin or the like, and covers the upper opening 81 of the case body 80, as shown in FIG. 4. The cover member 90 is fixed to the case body 80 by a fixing means such as a screw 90b. The cover member 90 is formed with an opening 91 to view the second focus lens 52. The opening 91 is shaped to correspond to the lens surface shape of the second focus lens 52.

The case body 80 and the cover member 90 configure the housing of the backlight unit 1.

As described above, one case body 80 is configured to contain optical parts such as the illuminance uniforming means 30, the first focus lens 51, and the reflective part 60. This facilitates assembling of the backlight unit 1. Further, the cover member 90 covers the parts other than the necessary part (i.e., the opening 91 to view the second focus lens 52). Thus, it is possible to prevent unnecessary leakage of the illumination light I to the outside of the backlight unit 1.

The liquid crystal display element 2 is, for example, configured by providing a polarizer on the front and rear sides of a liquid crystal panel of TFT (Thin Film Transistor) type. The liquid crystal panel constituting the liquid crystal display element 2 may be of a passive drive type. Further, as a liquid crystal panel, various types such as a TN (Twisted Nematic) type, a VA (Vertical Alignment) type, an STN (Super-Twisted Nematic), a ferroelectric type and the like are usable.

The liquid crystal display element 2 under the controlled of the control unit (not shown) displays a predetermined image by switching each pixel to transmissive or non-transmissive. For example, the control unit obtains various vehicle information transmitted from an ECU (Electronic Control Unit) of the vehicle C via a communication line, and causes the liquid crystal display element 2 to display an image representing a vehicle speed, fuel and the like. At the same time, the control unit causes the light source 10 to emit light, and the liquid crystal display element 2 is passed through and illuminated by the illumination light I generated by the backlight unit 1. As a result, the liquid crystal display element 2 emits the display light L representing a display image.

In this manner, the display light L is emitted from the display device 3 comprising the backlight unit 1 and the liquid crystal display element 2.

Returning to FIG. 2, the plane mirror 4 is formed with a reflective surface that is formed by depositing a metal such as aluminum on a base material made of resin, glass or the like. The plane mirror 4 reflects the display light L from the display device 3 toward the concave mirror 5.

The concave mirror 5 is formed with a reflective surface that is formed by depositing a metal such as aluminum on a base material made of resin, glass or the like. The reflective surface of the concave mirror 5 is concave, and the display light L from the display device 3 is enlarged and projected to the windshield S. Thus, the virtual image V to be recognized by the user U is enlarged from the image being displayed on the display device 3.

The housing 6 is formed in a box shape from a resin or the like, and contains the plane mirror 4 and the concave mirror 5. The plane mirror 4 and the concave mirror 5 are fixed to the inside of the housing 6 by a known method.

The housing 6 has, as shown in FIG. 2, an upper opening 6*a* and a lower opening 6*b*. The upper opening 6*a* opens toward the windshield S, and functions as an exit port for passing the display light L to the outside of the HUD apparatus 100. The lower opening 6*b* is located opposite to the upper opening 6*a*, and provided with the liquid crystal display element 2 in the lower end portion (the end portion downward in FIG. 2). In this manner, the lower opening 6*b* is formed to view the display surface of the liquid crystal display element 2 toward the inside of the housing 6.

As described above, the housing 6 is formed to surround the optical path of the display light L from the liquid crystal display element 2 to the upper opening 6*a* functioning as an exit port.

As shown in FIG. 2, the backlight unit 1 is located outside the housing 6, and fixed to the housing 6 from the lower opening 6*b* side. For example, by fixing the case body 80 to the housing 6 by a fixing means such as a screw 8, the backlight unit 1 is attached to the housing 6. At this time, the backlight unit 1 is attached such that the opening 91 of the cover member 90 covering the case body 80 (see FIG. 4) communicates with the lower opening 6*b* of the housing 6 (see FIG. 2).

The protection member 7 is made of resin or the like, and fixed to the housing 6 by a known method to cover the backlight unit 1 attached to the housing 6 from the lower side (lower side in FIG. 2). The protection member 7 being provided in this manner protects the backlight unit 1 from dust, vibration and the like.

A mechanism of the HUD apparatus 100 to enable the user U to recognize a predetermined image as a virtual image V will be briefly described in (1) and (2) below.

(1) The display light L is emitted by that the display device 3 displays an image. The display light L from the display device 3 reflects on the plane mirror 4 and the concave mirror 5, and advances to the windshield S. In this manner, the HUD apparatus 100 emits the display light L to the windshield S.

(2) The display light L from the HUD apparatus 100 reflects on the windshield S, and the virtual image V of a display image is formed in front of the windshield S as viewed from the user.

The backlight unit 1 described above comprises the light source 10 for emitting light to illuminate the liquid crystal display element 2, the condensing means (the first focus lens 51 and/or second focus lens 52) for condensing the light emitted from the light source 10 to correspond to the display area A of the liquid crystal display element 2, and the reflective part 60 having the reflective surface 61 for reflecting the light emitted from the light 10 to the liquid crystal display element 2. The backlight unit 1 is configured such that the reflective surface 61 is inclined to the optical axis AX of the light source 10, and the optical path of the light from the light source 10 to the liquid crystal display element 2 is replicated at the reflective part 60.

With this configuration, the reflective part 60 replicates the optical path of the light from the light source 10 to the liquid crystal display element 2, and it is unnecessary to align the optical parts on the rear side of the liquid crystal display element 2.

Thus, it is possible to avoid a structure that the backlight unit 1 unnecessarily projects to the rear side of the liquid crystal display element 2. Therefore, it is possible to increase the degree of freedom in designing the devices (display device 3 and the HUD apparatus 100 (an example of the display device)) to mount the backlight unit 1.

Further, in the backlight unit 1, the condensing means comprises the first focus lens 51 and the second focus lens 52, and the reflective part 60 is located between the first focus lens 51 and the second focus lens 52.

To effectively distribute the light illuminating the liquid crystal display element 2, it is necessary to ensure certain distance between the focus lenses. As described above, the reflective part 60 is provided at a location where the distance between the optical parts is long to replicate the optical path of the light from the light source 10 to the liquid crystal display element 2. Thus, it is possible to avoid more preferably the structure that the backlight unit 1 unnecessarily projects to the rear side of the liquid crystal display element 2. Further, with this configuration, it is possible to place the condensing means close to the illuminance uniforming means 30, and it is possible to downsize the focus lenses constituting the condensing means while efficiently illuminating the liquid crystal display element 2.

Further, the backlight unit 1 further comprises the illuminance uniforming means 30 that receives the light from the light source 10 and emits the incident light by substantially uniforming the illuminance. The illuminance uniforming means 30 is located between the light source 10 and the condensing means, and the reflective part 60 is located closer to the liquid crystal display element 2 than the illuminance uniforming means 30.

Thus, it is unnecessary to align the illuminance uniforming means 30 (light box), which is mostly formed in a shape extending along the optical path owing to its structure, on the rear side of the liquid crystal display element 2. Therefore, it is possible to avoid more preferably the structure that the backlight unit 1 unnecessarily projects to the rear side of the liquid crystal display element 2.

Furthermore, the HUD apparatus 100 (an example of the display device) comprises the backlight unit 1 and the liquid crystal display element 2, emits the display light L, which is emitted when the liquid crystal display element 2 is illuminated by the light from the light source 10 (illumination light I), to the outside of the device, and allows to recognize the image represented by the display light L at a predetermined position outside the device. The HUD apparatus 100 has the upper opening 6a functioning as an exit port to pass the display light L to the outside of the device, and further comprises the housing 6 formed to surround the optical path of the display light L from the liquid crystal display element 2 to the upper opening 6a. The backlight unit 1 is provided outside the housing 6.

The optical path of the display light L must be ensured in the housing 6, and it is difficult to lay out freely the backlight unit 1 in the housing 6. However, by arranging the backlight unit 1 outside the housing 6 as described above, it is possible to increase the degree of freedom of design.

The present invention is not limited to the above embodiment. Various modifications are possible. An example of modification will be shown below.

Modification

In the example described above, the condensing means comprises two focus lenses. The condensing means may comprise one or more than three focus lenses.

When the condensing means comprises one focus lens, from the viewpoint of efficiently distributing the illumination light to the liquid crystal display element 2, it is preferable to arrange the reflective part 60 closer to the light source 10 than the focus lens.

When the condensing means comprises three or more focus lenses, it is preferable to provide the reflective part 60 between the focus lens located closest to the light source 10 and the focus lens located closest to the liquid crystal display element 2. This is because, as described above, when the reflective part 60 is provided at a location where the distance between the optical parts is long, it is possible to avoid more preferably a structure that the backlight unit 1 unnecessarily projects to the rear side of the liquid crystal display element 2.

In the example described above, the reflective part 60 comprises a plane mirror. Configuration is not to be limited to this. The reflective surface 61 of the reflective part 60 may be formed to be curved, for example, spherical, toroidal, conic, or free curved.

In such a configuration, the reflective part 60 exhibits the lens effect, and has a function of controlling distribution of light to the liquid crystal display element 2. Thus, even when the condensing means comprises one focus lens, it is possible to precisely control the distribution of light. When the condensing means comprises two or more focus lenses, the number of focus lenses can be decreased by the same effect, and it is possible to save the space and reduce the cost.

In the embodiment described above, the reflective part 60 is arranged such that the optical path of the illumination light I from the reflective part 60 to the liquid crystal display element 2 is substantially perpendicular to the optical axis AX of the light source 10. Configuration is not to be limited to this. It is possible to provide the reflective part 60 by inclining the reflective surface 61 with respect to the optical axis AX of the light source 10 in accordance with a desired layout.

As long as the illumination performance of the liquid crystal display element 2 is satisfied, it is possible to appropriately add or delete the optical parts, such as a reflector other than the lens and the reflective part 60, in the backlight unit 1.

Further, it is possible to configure the HUD apparatus 100 without using one of the plane mirror 4 and the concave mirror 5 or using none of them.

Further, in the above description, the user U is allowed to recognize a display image by reflecting the display light L by the windshield S of the vehicle C. Configuration is not to be limited to this. It is permitted to recognize a display image by providing a combiner in the HUD apparatus 100 and reflecting the display light L by the combiner.

Furthermore, in the above description, the HUD apparatus 100 has been described as an example of a display device. A display device is not to be limited to this. As long as the display light L from the display device 3 is emitted to the outside of the device and the image represented by the display light L is allowed to be recognized at a predetermined position outside the device, any display device other than the HUD apparatus 100 may be used.

Further, in the above description, the vehicle C has been described as an example of a vehicle to mount the HUD apparatus 100. A vehicle is not limited to this. The HUD apparatus 100 may be mounted on other vehicles such as motorcycles, agricultural machines, ships, airplanes and the like.

The present invention is not to be limited by the above embodiments and drawings. It is possible to appropriately add changes (including deletion of constituent elements) to the embodiments and drawings without departing from the spirit and essential characteristics of the invention.

INDUSTRIAL APPLICABILITY

The present invention is applicable to a backlight unit comprising a light source for emitting light to illuminate a liquid crystal display element, a condensing means for condensing the light emitted from the light source to correspond to a display area of the liquid crystal display element, and a reflective part having a reflective surface to reflect the light emitted from the light source to the liquid crystal display element, and a display device (headup display device) comprising the backlight unit.

DESCRIPTION OF REFERENCE NUMERALS

100 HUD apparatus
1 Backlight unit
10 Light source
AX Optical axis
20 Parallel light generation means
30 Illuminance uniforming means 40 Lens array
51 First focus lens
52 Second focus lens
60 Reflective part
70 Diffusion plate
80 Case body
90 Cover member
I Illumination light
2 Liquid crystal display element
3 Display device
6 Housing
6a Upper Opening (Exit port)
L Display light
V Virtual image
U User

The invention claimed is:

1. A headup display apparatus comprising:
a liquid crystal display element including a display area through which display light is emitted towards a windshield of a vehicle to project a virtual image;
a light source for emitting light to illuminate the liquid crystal display element, wherein the liquid crystal element converts the light emitted from the light source to the display light;
an illuminance uniforming means disposed on an optical path of the light source, wherein the illuminance uniforming means receives the light from the light source and emits the light by uniforming illuminance of the light, the illuminance uniforming means including a mirror surface on a surface facing an optical axis of the light source;
a condensing means for condensing the light emitted from the illuminance uniforming means to correspond to the display area of the liquid crystal display element, wherein the illuminance uniforming means is located between the light source and the condensing means; and
a reflective part having a reflective surface for reflecting the light towards the liquid crystal display element, wherein the reflective surface is inclined to the optical axis of the light source to reflect the light from the light source towards the liquid crystal display element, and the reflective part is located closer to the liquid crystal display element than the illuminance uniforming means.

2. The headup display apparatus according to claim 1, wherein:
the condensing means comprises a plurality of focus lenses, and
the reflective part is located between a first focus lens and a second focus lens of the plurality of focus lenses.

3. The headup display apparatus according to claim 1, further comprising:
a housing encompassing an optical path of the display light emitted from the liquid display element and including an exit port for emitting the display light to the windshield,
wherein the light source, the illuminance uniforming means, the condensing means, and the reflective part are provided outside the housing.

* * * * *